United States Patent [19]

McJunkin

[11] Patent Number: 4,922,060

[45] Date of Patent: May 1, 1990

[54] ENHANCED INFORMATION OVERLAY FOR USE WITH A DIGITIZING PAD AND COMPUTER

[76] Inventor: James McJunkin, 9252 Chesapeake Dr., San Diego, Calif. 92123

[21] Appl. No.: 382,416

[22] Filed: Jul. 20, 1989

[51] Int. Cl.⁵ ............................................. G08C 21/00
[52] U.S. Cl. ..................................... 178/18; 340/700; 362/33; 362/84
[58] Field of Search ............... 178/18, 19, 20; 362/33, 362/84; 40/361, 341; 340/700, 710, 815.19

[56] References Cited

U.S. PATENT DOCUMENTS 4,414,609 11/1983 Shemitz ................................. 362/33

Primary Examiner—Stafford D. Schreyer
Attorney, Agent, or Firm—Henri J. A. Charmasson

[57] ABSTRACT

A series of enhancements to a digitizing pad, information overlay and input selector, which are used as input devices for many computer-aided design programs, eliminating operator fatigue caused by conflicting lighting requirements, viewing levels and focusing distances required for the digitizing pad and computer screen. The use of fluorescent color for symbols on the information overlay, illuminated by black light, provides an information overlay which can be used in the same low light which is best for computer screen reading and which closely simulates the background and contrast of the computer screen. The active area of the input selector, called the window, is also outlined in fluorescent color to facilitate use in the low light environment. The information overlay is viewed through a mirror which can be adjusted to the same height as the computer screen. These enhancements create an information overlay which can be viewed in the same lighting environment at the same eye level, with the same contrast and the same focal length as the computer screen, but which may be operated without raising the hand or input selector off the desktop.

12 Claims, 1 Drawing Sheet

ENHANCED INFORMATION OVERLAY FOR USE WITH A DIGITIZING PAD AND COMPUTER

FIELD OF THE INVENTION

This invention relates to computer input devices. It also relates to ergonomic peripherals for computers.

BACKGROUND OF THE INVENTION

Computer-aided design programs allow designers to draft, edit, analyze and test designs with the speed and accuracy of powerful desktop computers. While the designer is working, the computer sends its output to the computer screen, to be viewed by the designer. To facilitate input, a digitizing pad, information overlay and an input selector are used. The information overlay is imprinted with a "menu graphic." The menu graphic is a drawing consisting of various computer commands and symbols, arranged on the information overlay so that when the information overlay is laid upon the digitizing pad, the location of each command in relation to the digitizing pad is known to the computer. The input selection device is commonly called a "cursor" or a "puck." The cursor is placed upon the information overlay, and the computer knows its position on the digitizing pad. To use any particular command of the menu graphic, the operator need only place the window of the cursor over the command and push a button on the cursor. Since the computer knows the position of the cursor on the digitizing pad and since that position corresponds to a command of the menu graphic, the computer then knows that the operator has chosen the particular command. The computer then executes the command.

This system is also used for drawing in much the same way: The operator uses the cursor to draw on a "drawing area" of the information overlay. This drawing area corresponds to a drawing area known to the computer, and the computer displays the drawing on its screen as the operator draws. While this system enhances efficiency of input compared to typed input or on-screen windows, it creates several ergonomic problems of its own which prevent optimum operator comfort and efficiency.

First, the information overlay usually consists of a piece of white paper with the menu graphic imprinted in black ink. This requires a relatively bright lighting environment for comfortable viewing. However, the computer screen with which the information overlay is used is difficult to read in bright light and is best used in low light to make the computer screen legible. But then the operator must strain to see the information overlay. Conversely, operators may work in bright light to make the digitizing pad legible, but then they must strain to read the computer screen. Another alternative, spotlighting the information overlay in a low light environment, creates sharply contrasting light levels and glare which cause eye fatigue.

Second, the information overlay is designed to be used on the same desktop as the computer; it lies flat on the table while the computer screen is upright. This arrangement makes it easy and comfortable for the hand and arm to manipulate the cursor, but makes the information overlay difficult to read because it is distant and viewed at an angle. Operators may currently sit comfortably to view the computer screen and strain to see the information overlay. Conversely, operators may sit comfortably to view the information overlay and strain to see the computer screen. Lifting the digitizing pad to a vertical plane near the computer screen makes it difficult to keep the information overlay in place and makes use of the cursor difficult and tiresome.

SUMMARY OF THE INVENTION

The principle object of this invention is to enhance the comfort and efficiency of using an information overlay and cursor as input devices for computers.

It is also an object of this invention to provide an information overlay and cursor which are easily read under the same low light level which is the optimum light level for computer screen reading.

It is also an object of this invention to provide an information overlay which simulates the background/symbol contrast of the computer screen in order to provide very compatible contrast levels.

It is also an object of this invention to provide an information overlay which can be viewed at the same eye level and on the same plane as the computer screen, but which may still be used on the horizontal desktop.

These useful objects are achieved by manufacturing an information overlay of black paper or other dark sheet material, with characters, legends, menus, etc. of the menu graphic applied in fluorescent ink. The information overlay is then illuminated with a commercially available black light. This creates an information overlay which is easy to read in low light and which simulates the background, character brightness and contrast of a computer screen. The active area of the cursor window is also outlined in fluorescent color to make it easily discernible under low light. The fluorescent ink is commercially available, but may be replaced with any luminescent medium, either fluorescent or phosphorescent. Also, since some materials luminous under exposure to different wavelengths of light, known as the preferred adsorption wavelength, the black light and luminescent ink combination may be replaced by any combination of luminescent ink and corresponding preferred adsorption wavelength source. A shield is used to protect the operator from exposure to ultraviolet light if an ultraviolet light source is used. The shield and light are configured for optimum illumination of the information and optimum protection of the operator.

The information overlay may be viewed at the same eye level and on the same vertical plane as the computer screen by means of a mirror placed above the information overlay which may be raised, lowered, and titled to accommodate the operator. The menu graphic is printed upon the information overlay in mirror image so that it appears correctly, or right reading, in the mirror.

DESCRIPTION OF THE PREFERRED EMBODIMENT

Figure 1:
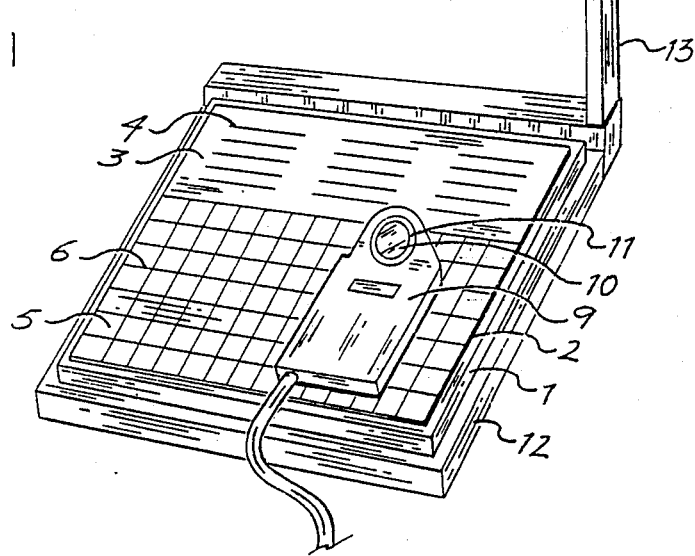
FIG. 1 is a perspective view of the information overlay with enhancements.

Referring now to the drawings, FIG. 1 shows a digitizing pad. The information overlay 2 is placed upon the digitizing pad. Area 3 represents the area of the information overlay 2 where the commands 4 of the menu graphic are printed, painted or silkscreened in fluorescent ink. Area 5 represents the drawing area of the information overlay 2 where gridlines 6 or other reference symbols of the menu graphic are printed or painted in fluorescent ink. A black light 7 illuminates the information overlay 2. A shield 8 protects the operator from direct exposure to ultraviolet light from the black light 7. The cursor 9 has a window 10 which is outlined with a ring 11, or other symbol useful for demarcating the window 10, painted in fluorescent ink. A base pan 12 holds the digitizing pad 1 and information overlay 2. A vertical post 13 is attached to the base pan 12. A mirror 14 is attached to the vertical post 13 so that it may be adjusted up and down. The mirror 14 is attached to the vertical post 13 by a tilt mechanism 15 which allows the mirror 14 to be tilted. The operator can raise and tilt the mirror 14 so that it may be viewed at the same height as the computer screen 2 with which the system is used. The black light 7 and shield 8 are mounted on the mirror 14. If the device is to be used without the mirror 14 and read directly, the black light 7 and shield 8 may be mounted on the base pan 12.

Figure 2:
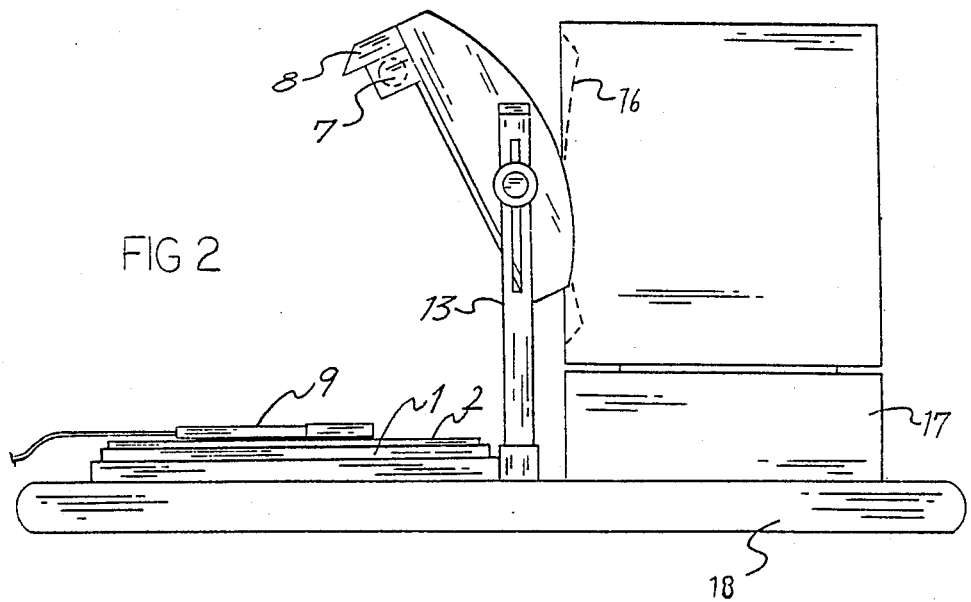
FIG. 2 is a side view of the information overlay in use.

FIG. 2 shows the digitizing pad, 1 information overlay 2, cursor 9 and mirror 14 supported on the vertical post 13. The system is placed next to the computer screen 16 and computer 17 on a desktop 18. FIG. 2 shows how the mirror 14 is used to reflect an image of the information overlay 2 at the same eye level as the computer screen 16. The operator may view both the computer screen 20 and the information overlay 2 easily, without straining to see one or the other. The cursor 9 is still operated on the same level as the digitizing pad 1 and information overlay 2, and the object of the invention is obtained by allowing the operator to view the information overlay 2 and computer 16 screen at the same level without making cursor 9 use less convenient. The shield 8 is large enough to prevent any ultraviolet light from the black light 7 from reaching the operator.

While the preferred embodiment of the invention in various configurations has been described, other embodiments and configurations may be devised without departing from the spirit of the invention and the scope of the appended claims.

what is claimed is:

1. In combination with a computer input device of the type using a digitizing pad, information overlay, and an input selector with which the operator enters information into the computer the improvement comprises:
   characters and symbols applied to the information overlay in a luminescent medium; and
   a means for illuminating said luminescent medium with the corresponding preferred adsorption wavelength.

2. The improvement of claim 1 which further comprises:
   a luminescent medium which is used to print characters and symbols upon the input selector; and
   a means for illuminating said luminescent medium upon said input selector with the corresponding preferred adsorption wavelength.

3. The improvement of claim 1 which further comprises:
   a mirror; and
   a means for aligning said mirror at a height above the information overlay to reflect the image of the information overlay to the operator.

4. The improvement of claim 3 wherein:
   the information overlay is printed in reverse and upside down image.

5. The improvement of claim 3 which further comprises:
   a means for tilting the mirror.

6. The improvement of claim 3 which further comprises:
   a means for adjusting the height of the mirror above the information overlay.

7. A device for viewing an information overlay which comprises:
   characters and symbols applied to the information overlay in a luminescent medium;
   a means for illuminating said luminescent medium with the corresponding preferred adsorption wavelength; and
   a mirror;
   a means for supporting said mirror at a height above the information overlay;
   the information overlay printed upside down and in reverse image; and
   a means for tilting the mirror; and
   a means for adjusting the height of the mirror above the information overlay.

8. The device of claim 7 wherein the means for illuminating comprises:
   a black light.

9. The improvement of claim 1 wherein the means for illuminating comprises:
   a black light.

10. A method for the use of a digitizing pad, information overlay and input selector in a low light environment which comprises:
    using a luminescent medium to print characters and symbols upon the information overlay; and
    illuminating said luminescent medium with the corresponding preferred adsorption wavelength.

11. The method of claim 10 which further comprises:
    printing the information overlay in reverse and upside down image; and
    viewing the information overlay through a mirror.

12. The method of claim 10 which further comprises:
    using a luminescent medium to apply characters and symbols upon the input selector; and
    illuminating said luminescent medium upon said input selector with the corresponding preferred adsorption wavelength.

* * * * *